(12) United States Patent
Ostdiek et al.

(10) Patent No.: US 12,044,194 B2
(45) Date of Patent: Jul. 23, 2024

(54) PROPULSION SYSTEM ARCHITECTURE

(71) Applicant: General Electric Company, Schenectady, NY (US)

(72) Inventors: David Marion Ostdiek, Liberty Township, OH (US); Alan Roy Stuart, Cincinnati, OH (US); Daniel Alan Niergarth, Cincinnati, OH (US); Gert Johannes van der Merwe, Lebanon, OH (US); Brandon Wayne Miller, Liberty Township, OH (US); Stephen William Freund, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 258 days.

(21) Appl. No.: 16/811,368

(22) Filed: Mar. 6, 2020

(65) Prior Publication Data

US 2021/0108597 A1 Apr. 15, 2021

Related U.S. Application Data

(60) Provisional application No. 62/915,324, filed on Oct. 15, 2019.

(51) Int. Cl.
*F02K 3/077* (2006.01)
*B64D 27/10* (2006.01)
(Continued)

(52) U.S. Cl.
CPC ............. *F02K 3/072* (2013.01); *B64D 27/10* (2013.01); *F02C 3/073* (2013.01); *F02K 1/34* (2013.01);
(Continued)

(58) Field of Classification Search
CPC ...... F02K 3/077; B64D 2027/005; F02C 7/24
See application file for complete search history.

(56) References Cited

U.S. PATENT DOCUMENTS 3,542,152 A * 11/1970 Oxx, Jr. .................... B32B 3/12
415/200
3,750,402 A * 8/1973 Vdoviak ................. F02K 1/386
60/762
(Continued)

FOREIGN PATENT DOCUMENTS

DE 1081277 B * 5/1960 ............ F02K 3/077
EP 1988274 A2 * 11/2008 ............ F02K 3/077
EP 2540989 A2 1/2013

OTHER PUBLICATIONS

Sibbach, A.W., et al., Gas Turbine Engine Booster Configuration and Methods of Operation, co-pending U.S. Appl. No. 16/811,384, filed Mar. 6, 2020.

*Primary Examiner* — Todd E Manahan
*Assistant Examiner* — Marc J Amar
(74) *Attorney, Agent, or Firm* — Dority & Manning, P.A.

(57) ABSTRACT

A propulsion system, the propulsion system comprising a rotating element, a stationary element, and an inlet between the rotating element and the stationary element, wherein the inlet passes radially inward of the stationary element; wherein the inlet passes radially inward of the stationary element; wherein the inlet leads to an inlet duct containing a ducted fan having an axis of rotation and a plurality of blades; and wherein the inlet duct divides into a first duct and a second duct, separate from the first duct. A method of operating a propulsion system, comprising the steps of: operating a first rotating fan assembly to produce a first stream of air; directing a portion of the first stream of air into a second ducted rotating fan assembly; operating the second ducted rotating fan assembly to produce a second stream of
(Continued)

air; dividing the second stream of air into a core stream and a fan stream; and directing the core stream into a gas turbine engine core.

17 Claims, 15 Drawing Sheets

(51) Int. Cl.
*F02C 3/073* (2006.01)
*F02K 1/34* (2006.01)
*F02K 3/02* (2006.01)
*F02K 3/072* (2006.01)
*F02K 3/075* (2006.01)

(52) U.S. Cl.
CPC .............. *F02K 3/025* (2013.01); *F02K 3/075* (2013.01); *F02K 3/077* (2013.01)

(56) References Cited

U.S. PATENT DOCUMENTS

| | | | |
|---|---|---|---|
| 4,043,121 A | 8/1977 | Thomas et al. | |
| 4,065,322 A * | 12/1977 | Langford | B24C 1/003 451/39 |
| 4,240,252 A * | 12/1980 | Sargisson | F02K 1/386 181/220 |
| 4,446,696 A * | 5/1984 | Sargisson | F02K 3/077 60/226.3 |
| 4,486,146 A | 12/1984 | Campion | |
| 4,892,269 A | 1/1990 | Greco et al. | |
| 4,992,946 A * | 2/1991 | Butz | G07C 3/00 701/100 |
| 5,261,227 A * | 11/1993 | Giffin, III | F01D 17/162 60/226.3 |
| 7,559,191 B2 | 7/2009 | Parks | |
| 8,276,392 B2 | 10/2012 | van der Woude | |
| 8,689,538 B2 | 4/2014 | Sankrithi et al. | |
| 8,876,465 B2 | 11/2014 | Stretton | |
| 8,943,796 B2 | 2/2015 | McCaffrey | |
| 8,967,967 B2 | 3/2015 | Stretton et al. | |
| 9,534,538 B1 | 1/2017 | Cerny | |
| 9,683,547 B2 | 6/2017 | Kim et al. | |
| 9,995,314 B2 | 6/2018 | Miller et al. | |
| 10,077,660 B2 | 9/2018 | Hofer et al. | |
| 10,126,062 B2 | 11/2018 | Cerny et al. | |
| 10,184,400 B2 | 1/2019 | Cerny et al. | |
| 10,253,648 B2 | 4/2019 | Bentley et al. | |
| 10,260,419 B2 | 4/2019 | Cerny et al. | |
| 10,344,674 B2 | 7/2019 | Cerny et al. | |
| 10,371,163 B2 | 8/2019 | Bishop et al. | |
| 10,436,035 B1 | 10/2019 | Baralon et al. | |
| 10,443,436 B2 | 10/2019 | Miller et al. | |
| 10,487,739 B2 | 11/2019 | Miller et al. | |
| 10,677,158 B2 | 6/2020 | Miller et al. | |
| 2005/0109012 A1 * | 5/2005 | Johnson | F02K 3/065 60/262 |
| 2005/0241292 A1 * | 11/2005 | Taylor | F02C 3/067 60/791 |
| 2007/0186535 A1 * | 8/2007 | Powell | F02K 3/072 60/263 |
| 2007/0251212 A1 * | 11/2007 | Tester | F01D 25/28 60/262 |
| 2009/0013532 A1 | 1/2009 | Wood et al. | |
| 2009/0169359 A1 * | 7/2009 | Murphy | F02K 1/46 415/176 |
| 2010/0326050 A1 * | 12/2010 | Schilling | H02K 16/02 60/268 |
| 2011/0056183 A1 * | 3/2011 | Sankrithi | F02K 3/06 60/226.1 |
| 2013/0000314 A1 * | 1/2013 | McCaffrey | F01D 13/003 60/773 |
| 2013/0098050 A1 * | 4/2013 | Kupratis | F02K 3/075 60/772 |
| 2013/0104521 A1 * | 5/2013 | Kupratis | F02K 3/075 60/226.1 |
| 2013/0104522 A1 * | 5/2013 | Kupratis | F02C 9/52 60/226.3 |
| 2013/0104560 A1 * | 5/2013 | Kupratis | F02C 9/20 60/772 |
| 2014/0345253 A1 | 11/2014 | Dawson et al. | |
| 2014/0345254 A1 * | 11/2014 | Dawson | F02K 3/075 60/226.3 |
| 2015/0121893 A1 * | 5/2015 | Kupratis | F04D 25/045 60/774 |
| 2015/0176530 A1 * | 6/2015 | Schwarz | F02C 3/107 60/726 |
| 2015/0284070 A1 | 10/2015 | Breeze-Stringfellow et al. | |
| 2015/0291276 A1 | 10/2015 | Zatorski et al. | |
| 2016/0010487 A1 | 1/2016 | Breeze-Stringfellow et al. | |
| 2016/0090863 A1 * | 3/2016 | Diaz | F28D 20/003 60/39.1 |
| 2016/0115902 A1 * | 4/2016 | Kerbler | F02K 1/1207 239/265.19 |
| 2016/0160647 A1 | 6/2016 | Hofer et al. | |
| 2016/0298550 A1 * | 10/2016 | Kupratis | F02C 9/18 |
| 2016/0333734 A1 * | 11/2016 | Bowden | F04D 29/329 |
| 2017/0051678 A1 | 2/2017 | Becker, Jr. | |
| 2017/0051680 A1 | 2/2017 | Becker, Jr. et al. | |
| 2017/0114721 A1 | 4/2017 | Miller et al. | |
| 2017/0145956 A1 * | 5/2017 | Miller | F02K 1/72 |
| 2017/0167382 A1 | 6/2017 | Miller et al. | |
| 2017/0184027 A1 | 6/2017 | Moniz et al. | |
| 2017/0198719 A1 | 7/2017 | Cerny et al. | |
| 2018/0065727 A1 | 3/2018 | Gruber et al. | |
| 2018/0118364 A1 | 5/2018 | Golshany et al. | |
| 2018/0215475 A1 | 8/2018 | Hurt et al. | |
| 2018/0283795 A1 | 10/2018 | Cerny et al. | |
| 2019/0136710 A1 | 5/2019 | Breeze-Stringfellow et al. | |
| 2019/0153952 A1 | 5/2019 | Niergarth et al. | |
| 2019/0153953 A1 | 5/2019 | Niergarth et al. | |
| 2019/0218971 A1 * | 7/2019 | Niergarth | F02C 7/185 |
| 2019/0249599 A1 | 8/2019 | Sen et al. | |
| 2019/0257247 A1 | 8/2019 | Pal et al. | |
| 2019/0360401 A1 | 11/2019 | Rambo et al. | |
| 2020/0025109 A1 * | 1/2020 | Stieger | F02C 9/20 |
| 2020/0116104 A1 * | 4/2020 | Levisse | F02K 3/072 |
| 2020/0332718 A1 * | 10/2020 | Rambo | F02K 3/077 |

\* cited by examiner

PROPULSION SYSTEM ARCHITECTURE

CROSS-REFERENCE TO RELATED APPLICATION

This application claims priority to provisional application Ser. No. 62/915,324, filed Oct. 15, 2019, which is incorporated herein by reference in its entirety.

BACKGROUND OF THE INVENTION

The technology described herein relates to open rotor and ducted propulsion systems, and particularly architectures for such systems. The technology is of particular benefit when applied to gas turbine engines for aircraft propulsion.

Gas turbine engines employing an open rotor design architecture are known. A turbofan engine operates on the principle that a central gas turbine core drives a bypass fan, the fan being located at a radial location between a nacelle of the engine and the engine core such that the fan operates within a "duct" formed by the inner surface of the nacelle but air driven by the fan "bypasses" the central gas turbine core. An open rotor propulsion system instead operates on the principle of having the bypass fan located outside of the engine nacelle, in other words, "unducted". This permits the use of larger fan blades able to act upon a larger volume of air than for a turbofan engine, and thereby improves propulsive efficiency over conventional ducted engine designs.

Optimum performance has been found with an open rotor design having a fan provided by two contra-rotating rotor assemblies, each rotor assembly carrying an array of airfoil blades located outside the engine nacelle. As used herein, "contra-rotational relationship" means that the blades of the first and second rotor assemblies are arranged to rotate in opposing directions to each other. Typically the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). In appearance, the fan blades of an open rotor engine resemble the propeller blades of a conventional turboprop engine.

The use of contra-rotating rotor assemblies provides technical challenges in transmitting power from the power turbine to drive the blades of the respective two rotor assemblies in opposing directions.

It would be desirable to provide a propulsion system which reduces the complexity of the design, yet yields a level of propulsive efficiency comparable to contra-rotating propulsion designs with a significant weight and length reduction.

BRIEF DESCRIPTION OF THE INVENTION

In one aspect, a propulsion system, the propulsion system comprising a rotating element, a stationary element, and an inlet between the rotating element and the stationary element, wherein the inlet passes radially inward of the stationary element; wherein the inlet passes radially inward of the stationary element; wherein the inlet leads to an inlet duct containing a ducted fan having an axis of rotation and a plurality of blades; and wherein the inlet duct divides into a first duct and a second duct, separate from the first duct.

In another aspect, a method of operating a propulsion system, comprising the steps of: operating a first rotating fan assembly to produce a first stream of air; directing a portion of the first stream of air into a second ducted rotating fan assembly; operating the second ducted rotating fan assembly to produce a second stream of air; dividing the second stream of air into a core stream and a fan stream; and directing the core stream into a gas turbine engine core.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The accompanying drawings, which are incorporated in and constitute a part of the specification, illustrate one or more embodiments and, together with the description, explain these embodiments. In the drawings.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
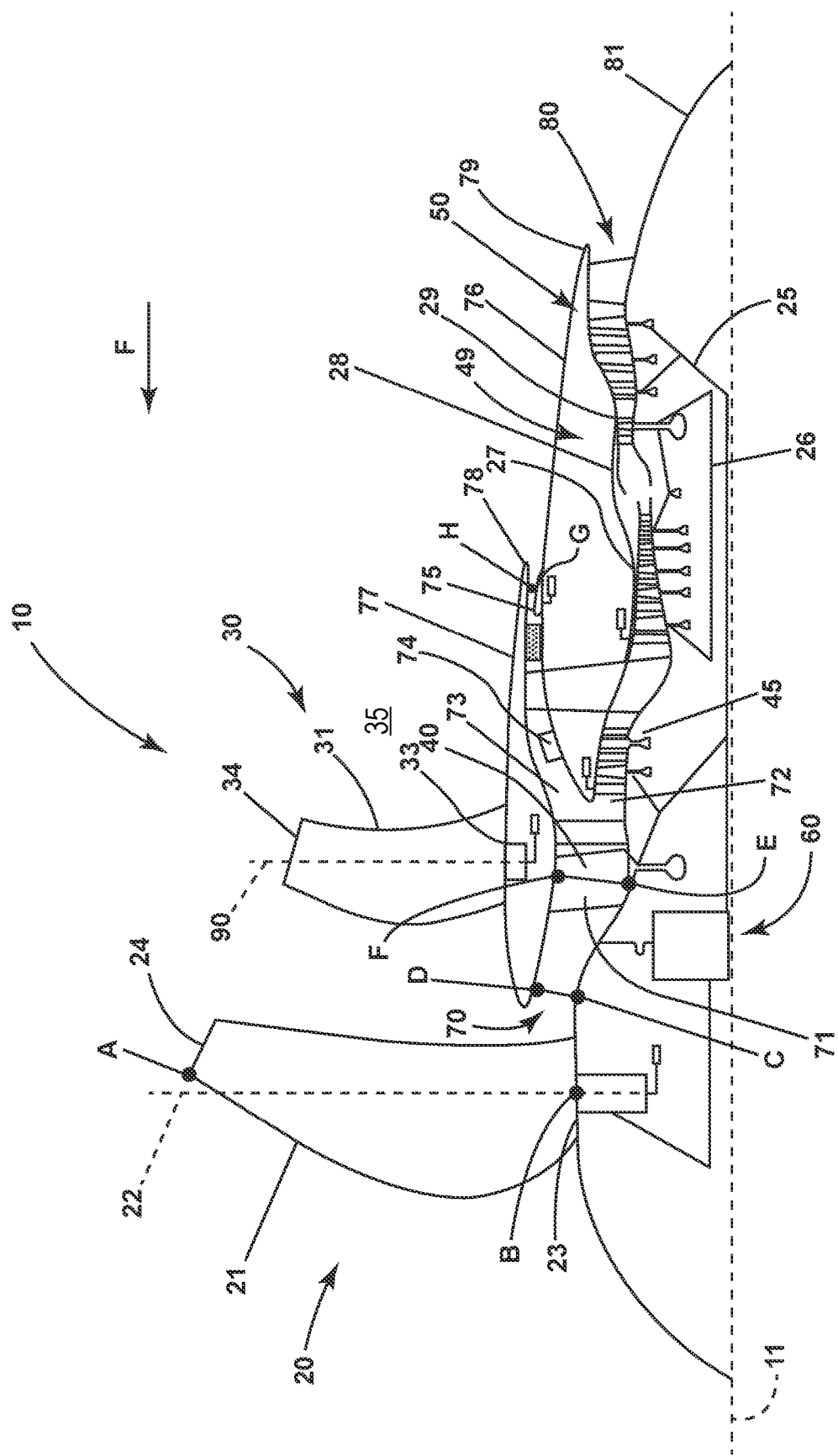
FIG. 1 is a cross-sectional schematic illustration of an exemplary embodiment of an open rotor propulsion system.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 2, 5, 10, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 shows an elevational cross-sectional view of an exemplary embodiment of an open rotor propulsion system 10. As is seen from FIG. 1, the open rotor propulsion system 10 has a rotating element 20 which includes an array of fan airfoil blades 21 around a central longitudinal axis 11 of the open rotor propulsion system 10. Blades 21 are arranged in typically equally spaced relation around the centerline 11, and each blade 21 has a root 23 and a tip 24, and a span defined therebetween, as well as a central blade axis 22. Open rotor propulsion system 10 includes a gas turbine engine having a gas turbine core 49 and a low pressure (LP) turbine 50. Gas turbine core 49 includes a high pressure (HP) compressor 27, a combustor 28, and a high pressure (HP) turbine 29 in serial flow relationship. A high pressure (HP) shaft 26 enables the HP turbine 29 to drive the HP compressor 27. A low pressure (LP) shaft 25 enables the LP turbine 50 to drive the rotating element 20 and low pressure (LP) compressor, or booster, 45.

Figure 2:
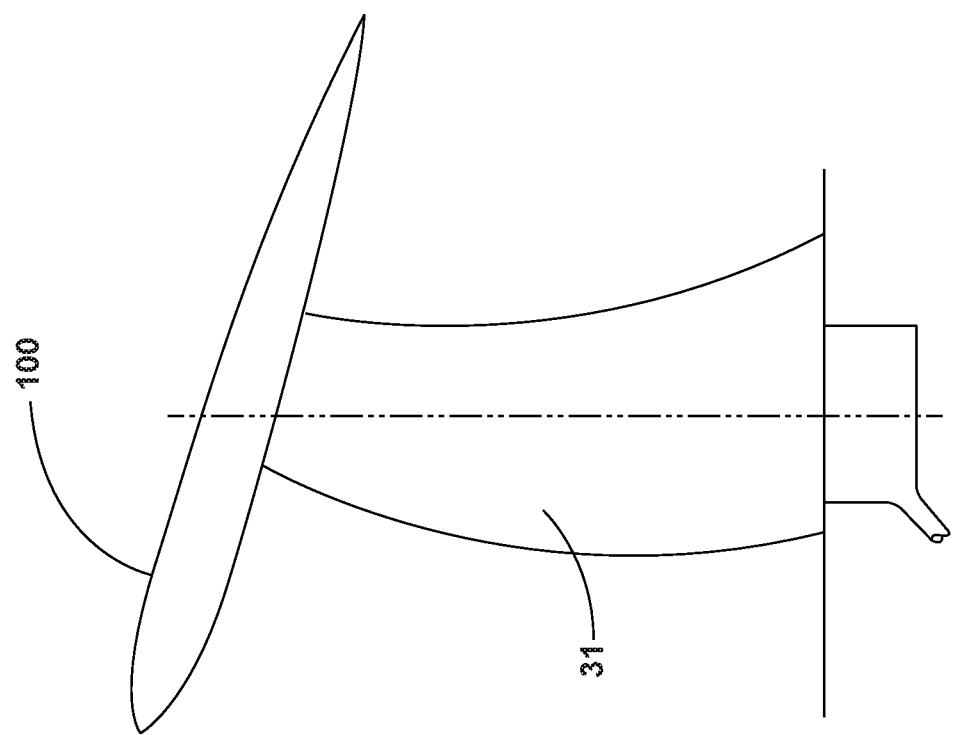
FIG. 2 is an illustration of an alternative embodiment of an exemplary vane assembly for an open rotor propulsion system.

Open rotor propulsion system 10 also includes, in the exemplary embodiment of FIG. 1, a non-rotating stationary element 30 which includes an array of vanes 31 also disposed around central axis 11, and each vane 31 has a root 33 and a tip 34 and a span defined therebetween. These vanes 31 may be arranged such that they are not all equidistant from the rotating assembly, and be unshrouded (as shown in FIG. 1) or may optionally include an annular shroud or duct 100 (as shown in FIG. 2) distally from axis 11 (axis 11 is shown in FIG. 1). These vanes are mounted to a stationary frame and do not rotate relative to the central axis 11, but may include a mechanism for adjusting their orientation relative to their axis 90 and/or relative to the blades 21. For reference purposes, FIG. 1 also depicts a Forward direction denoted with arrow F, which in turn defines the forward and aft portions of the system. As shown in FIG. 1, the rotating element 20 is located forward of the gas turbine core 49 in a "puller" configuration, and the exhaust 80 is located aft of the stationary element 30.

Figure 3:
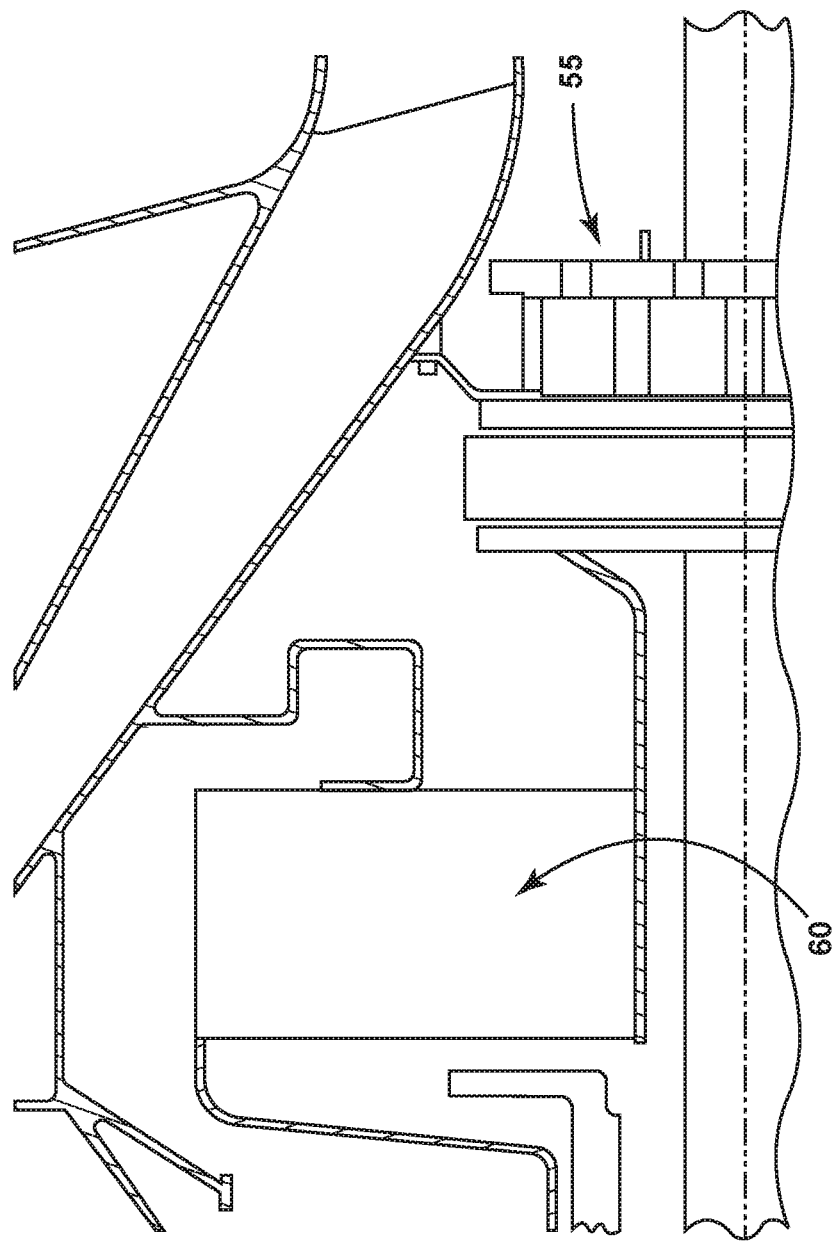
FIG. 3 is a partial cross-sectional schematic illustration of an exemplary embodiment of an open rotor propulsion system depicting an exemplary compound gearbox configuration.
Figure 4:
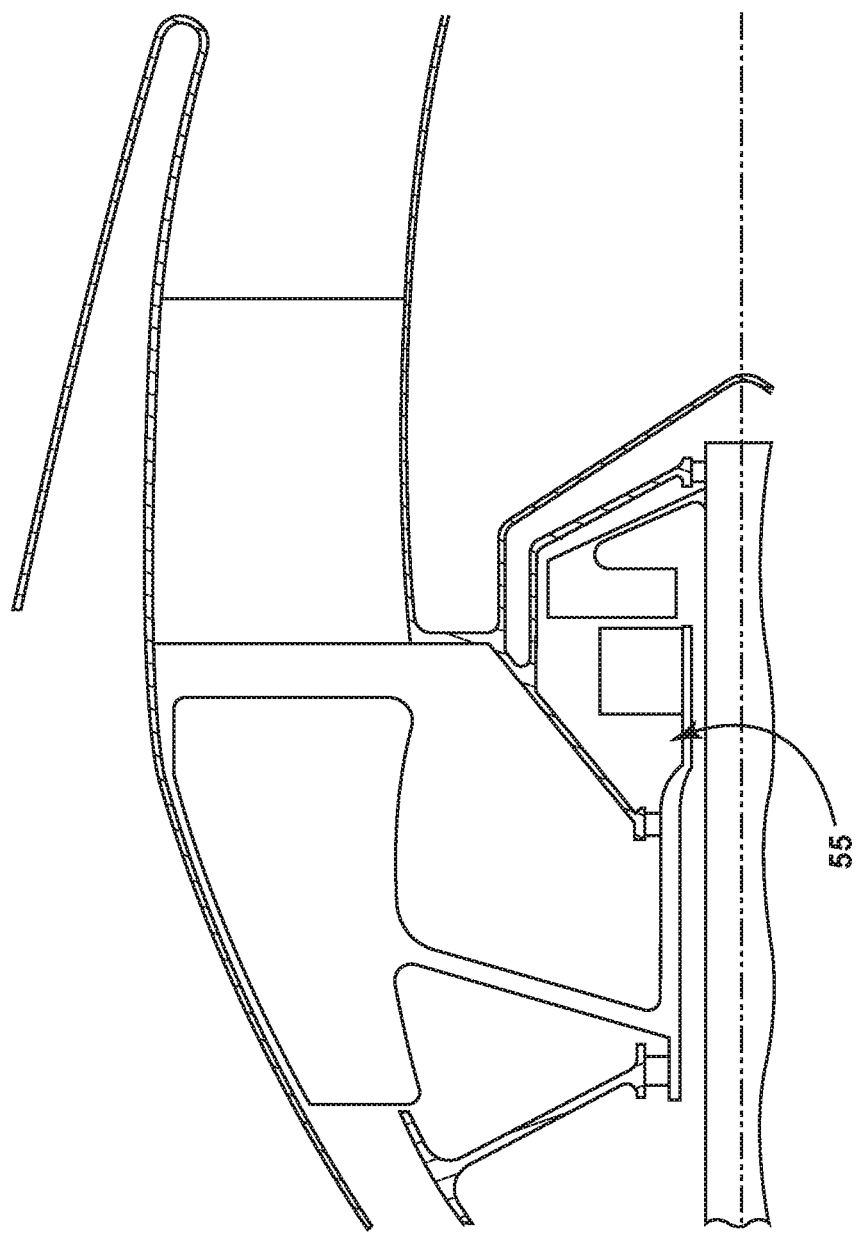
FIG. 4 is a partial cross-sectional schematic illustration of an exemplary embodiment of an open rotor propulsion system depicting another exemplary gearbox configuration.

Left- or right-handed engine configurations, useful for certain installations in reducing the impact of multi-engine torque upon an aircraft, can be achieved by mirroring the airfoils of 21, 31, and 50 such that the rotating element 20 rotates clockwise for one propulsion system and counter-clockwise for the other propulsion system. As an alternative, an optional reversing gearbox 55 (located in or behind the low pressure turbine 50 as shown in FIG. 4 or combined or associated with power gearbox 60 as shown in FIG. 3) permits a common gas turbine core 49 and low pressure turbine 50 to be used to rotate the fan blades either clockwise or counterclockwise, i.e., to provide either left- or right-handed configurations, as desired, such as to provide a pair of oppositely-rotating engine assemblies can be provided for certain aircraft installations while eliminating the need to have internal engine parts designed for opposite rotation directions. Open rotor propulsion system 10 in the embodiment shown in FIG. 1 also includes a power gearbox 60 which may include a gearset for decreasing the rotational speed of the rotating element 20 relative to the low pressure turbine 50. The blades 21 of the open, unducted rotating element may have a fixed pitch or blade angle, or may instead have a variable pitch or blade angle to vary thrust and blade loading during operation and, in some configurations, to provide a reverse thrust configuration for aircraft deceleration upon landing.

In addition to the noise reduction benefit, the duct 100 shown in FIG. 2 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The duct 100 may allow the pitch of the vanes to be varied as desired.

A significant, perhaps even dominant, portion of the noise generated by the disclosed fan concept, e.g., the embodiment of FIG. 1, is associated with the interaction between wakes and turbulent flow generated by the upstream blades 21 and its acceleration and impingement on the downstream vanes 31. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes 31, multiple reflections of acoustic waves emanating from the stationary vanes can be substantially attenuated.

In operation, the rotating blades 21 are driven by the low pressure turbine 50 via gearbox 60 such that they rotate around the axis 11 and generate thrust to propel the open rotor propulsion system 10, and hence an aircraft to which it is associated, in the forward direction F.

It may be desirable that either or both of the blades 21 or the vanes 31 incorporate a pitch change mechanism such that the blades can be rotated with respect to an axis of pitch rotation (annotated as 22 or 90, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 31 are sized, shaped, and configured to impart a counteracting swirl to the fluid so that in a downstream direction aft of both blades 21 and vanes 31 the fluid has a greatly reduced degree of swirl, which translates to an increased level of induced efficiency. Vanes 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

Blades 21 may be sized, shaped, and contoured with the desired blade loading in mind. One possible blade architecture is shown and described in commonly-assigned, issued U.S. Pat. No. 10,202,865, which is incorporated herein by reference.

In the embodiment shown in FIG. 1, an annular 360 degree inlet 70 is located between the rotating element 20 and the fixed or stationary element 30, and provides a path for incoming atmospheric air to enter the gas turbine core 49 radially inwardly of the stationary element 30. As will be appreciated, a portion of an airflow from the rotating blades 21 is received through the inlet 70 during operation, and another portion is provided through a bypass airflow stream 35 defined by the propulsion system 10 (having the stationary element 30 positioned therein). Such a location may be advantageous for a variety of reasons, including management of icing performance as well as protecting the inlet 70 from various objects and materials as may be encountered in operation.

FIG. 1 illustrates what may be termed a "puller" configuration where the thrust-generating rotating element 20 is located forward of the gas turbine core 49. Other configurations are possible and contemplated as within the scope of the present disclosure, such as what may be termed a "pusher" configuration embodiment where the gas turbine core 49 is located forward of the rotating element 20. A variety of architectures are shown and described in commonly-assigned, US patent application publication US2015/0291276A1, which is incorporated herein by reference.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

In the exemplary embodiment of FIG. 1, in addition to the open rotor or unducted rotating element 20 with its plurality of fan airfoil blades 21, a ducted fan 40 is included behind the open rotor rotating element 20, such that the open rotor propulsion system 10 includes both a ducted and an unducted fan which both serve to generate thrust through the movement of air at atmospheric temperature without passage through the gas turbine core 49. The ducted fan 40 is shown at about the same axial location as vane 31, and radially inward of the vane root 33. Alternatively, the ducted fan 40 may be between the vane 31 and core duct 72, or be farther forward of the vane 31. The ducted fan 40 may be driven by the low pressure turbine 50, or by any other suitable source of rotation, and may serve as the first stage of booster 45 or may be operated separately. Air entering the inlet 70 flows through an inlet duct 71 and then is divided such that a portion flows through a core duct 72 and a portion flows through a fan duct 73. Fan duct 73 may incorporate heat exchangers 74, and exhausts to the atmosphere through an independent fixed or variable nozzle 78 aft of the stationary element 30 and outside of the gas generator core cowl 76. Air flowing through the fan duct 73 thus "bypasses" the core of the engine and does not pass through the core. Open rotor propulsion system 10 therefore includes an unducted fan formed by rotating element 20, followed by a ducted fan 40, which directs airflow into two concentric or non-concentric ducts 72 and 73, thereby forming a three stream engine architecture with 3 paths for air which passes through the rotating element 20.

Actuation for the nozzle 75 may be linked to the outlet guide vanes (OGVs), booster variable stator vanes (VSVs), and/or variable bleed valves (VBVs) and it may be mechanically linked to booster inlet guide vanes (IGVs), VBVs, and/or vane 31 actuation. Ducted fan 40 may include a fixed or variable inlet guide vane (IGV) 44 and a fixed or variable outlet guide vane (OGV) 43 and the fan duct 73 may include struts, optionally aerodynamically shaped, such as struts 41 and 42. If a VBV system is present, the exhaust may be mixed into the ducted fan bypass stream and exit through the nozzle 78.

Figure 5:
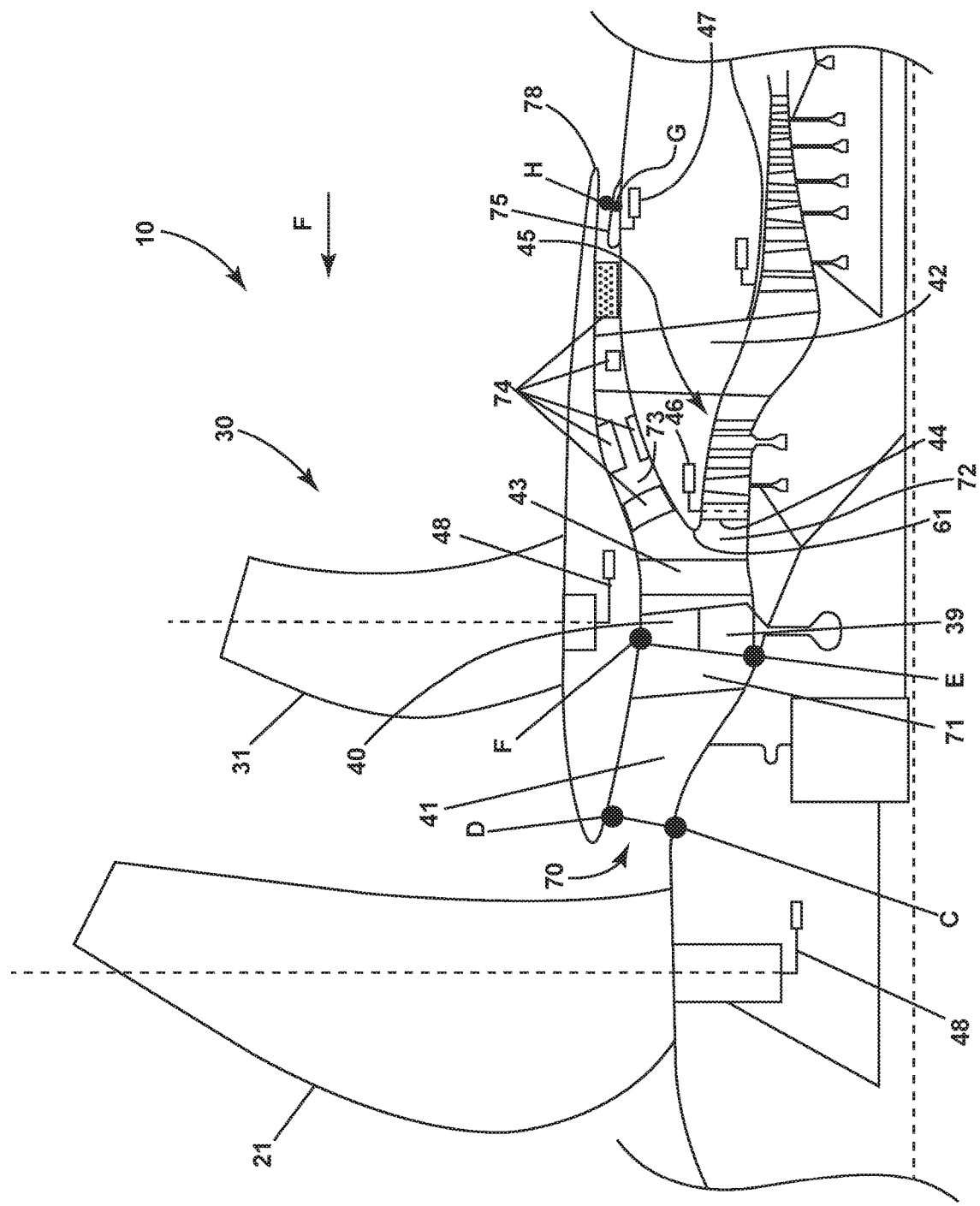
FIG. 5 is an enlarged, partial cross-sectional schematic illustration of the open rotor propulsion system of FIG. 1, depicting an exemplary heat exchanger installation in the fan duct.

In the exemplary embodiment shown in FIGS. 1 and 5, a slidable, moveable, and/or translatable plug nozzle 75 with an actuator 47 may be included in order to vary the exit area of the nozzle 78. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 78 has a consistent "home" position to which it returns in the event of any system failure, which may prevent commands from reaching the nozzle 78 and/or its actuator 47.

Since the open rotor propulsion system 10 includes both an open rotor rotating assembly 20 and a ducted fan assembly 40, the thrust output of both and the work split between them can be tailored to achieve specific thrust, fuel burn, thermal management, and acoustic signature objectives which may be superior to those of a typical ducted fan gas turbine propulsion assembly of comparable thrust class. The ducted fan assembly 40, by lessening the proportion of the thrust required to be provided by the unducted fan assembly 20, may permit a reduction in the overall fan diameter of the unducted fan assembly and thereby provide for installation flexibility and reduced weight.

Operationally, the open rotor propulsion system 10 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow.

The ducted fan stream flowing through fan duct 73 may include one or more heat exchangers 74 for removing heat from various fluids used in engine operation (such as an air-cooled oil cooler (ACOC), cooled cooling air (CCA), etc.). The heat exchangers 74 may take advantage of the integration into the fan duct 73 with reduced performance penalties (such as fuel efficiency and thrust) compared with traditional ducted fan architectures, due to not impacting the primary source of thrust which is, in this case, the unducted fan stream which is the major source of engine thrust. Heat exchangers may cool fluids such as gearbox oil, engine sump oil, thermal transport fluids such as supercritical fluids or commercially available single-phase or two-phase fluids (supercritical CO2, EGV, Syltherm 800, liquid metals, etc.), engine bleed air, etc. Heat exchangers may also be made up of different segments or passages that cool different working fluids, such as an ACOC paired with a fuel cooler.

Heat exchangers 74 may be incorporated into a thermal management system which provides for thermal transport via a heat exchange fluid flowing through a network to remove heat from a source and transport it to a heat exchanger. One such system is described in commonly-assigned, issued U.S. Pat. No. 10,260,419, which is incorporated herein by reference.

Since the fan pressure ratio is higher for the ducted fan than for the unducted fan, the fan duct provides an environment where more compact heat exchangers may be utilized than would be possible if installed on the outside of the core cowl in the unducted fan stream. Fan bypass air is at a very low Fan Pressure Ratio (FPR) (1.05 to 1.08), making it difficult to drive air through heat exchangers. Without the availability of a fan duct as described herein, scoops or booster bleed air may be required to provide cooling air to and through heat exchangers. A set of parameters can be developed around heat exchangers in the fan duct, based on heat load, heat exchanger size, ducted fan stream corrected flow, and ducted fan stream temperature.

The fan duct 73 also provides other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the core cowl 76 and the exhaust plane 80. The close-out angle is normally limited by air flow separation, but boundary layer energization by air from the fan duct 73 exhausting over the core cowl reduces air flow separation. This yields a shorter, lighter structure with less frictional surface drag.

FIG. 5 is an enlarged, partial cross-sectional schematic illustration of the open rotor propulsion system of FIG. 1, depicting an exemplary heat exchanger installation in the fan duct. Heat exchanger 74 may comprise any suitable heat exchanger design and installation, including surface coolers extending circumferentially around a substantial portion of the inner surface of the fan cowl, or the outer surface of the core cowl (as shown in FIG. 5) within the fan duct, or may be one or more discrete exchangers of the "brick" design where the heat exchanger is a discrete element with fluid conduits and heat transfer aids such as fins combined into a compact configuration which can be placed at suitable annular locations or affixed to structures such as struts or OGV's. Surface coolers typically include a single layer of cooling passages in an exchanger mounted to a surface over which a cooling fluid such as air passes. Conventional plate-fin (or similar) orthogonal exchangers typically include several layers of fluid passages and the cooling fluid such as air passes between the passages. These "brick" type exchangers typically are more compact in overall lateral dimensions but protrude farther into the air flow, while surface coolers typically have a broader lateral dimension and protrude less into the air flow.

Additional elements shown in this enlarged view in FIG. 5 include the ducted fan outlet guide vanes (OGV's) 43, which may be fixed or variable, booster inlet guide vanes (IGV's) 44, and the splitter 61 which divides the inlet duct flow into the core stream entering the core duct 72 and the fan stream flowing through the fan duct 73. An actuator 46 may be utilized to adjust the booster IGV 44. A pitch change mechanism 48 is also shown associated with the vanes 31 of the stationary element or blade row 30. Also, FIG. 5 depicts a variation of the ducted fan 40 in that a splittered rotor with part-span blades 39 interdigitated with full-span blades 39 may be incorporated. Splittered rotors are described in greater detail in commonly-assigned US patent application publication US 2018/0017079A1, which is incorporated herein by reference.

Figure 6:
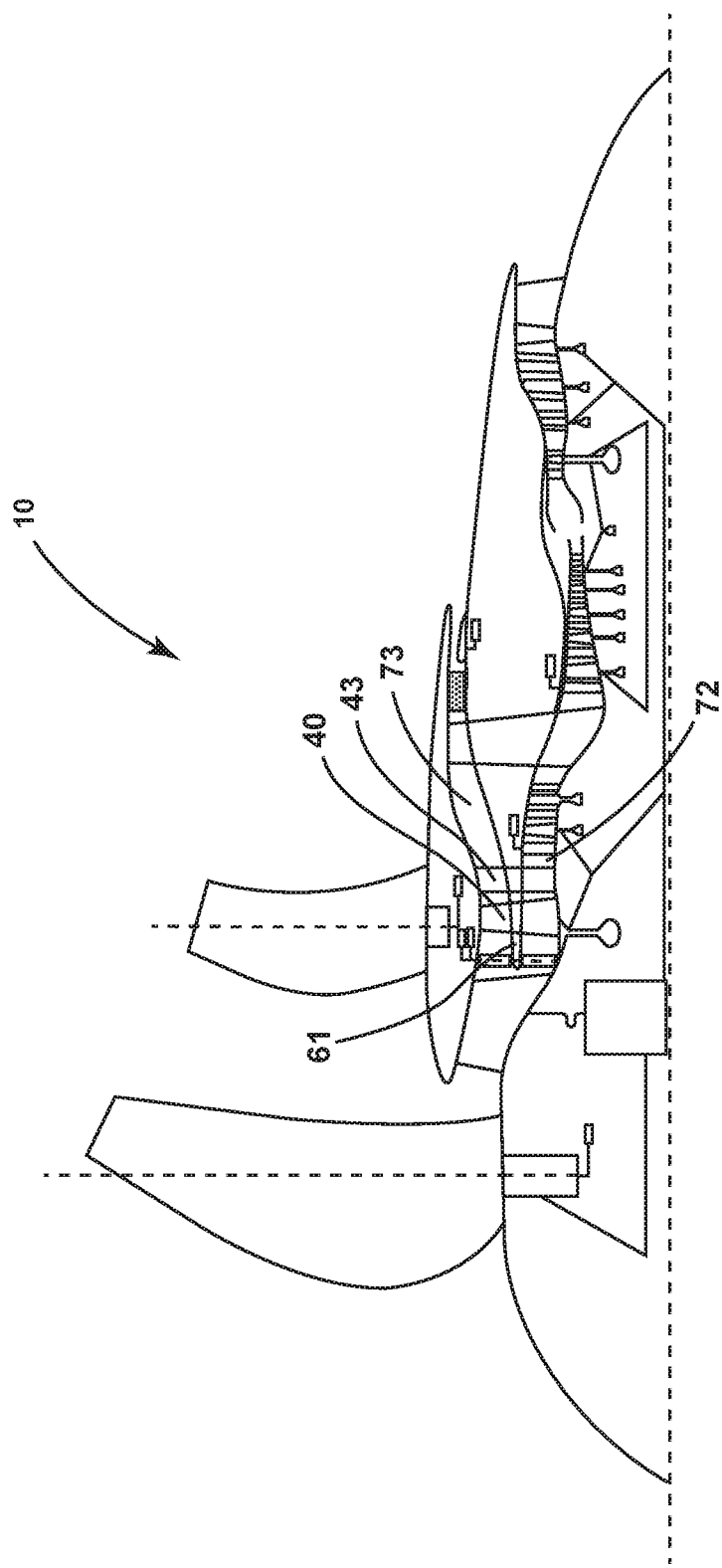
FIG. 6 is a cross-sectional schematic illustration of an exemplary embodiment of an open rotor propulsion system.
Figure 7:
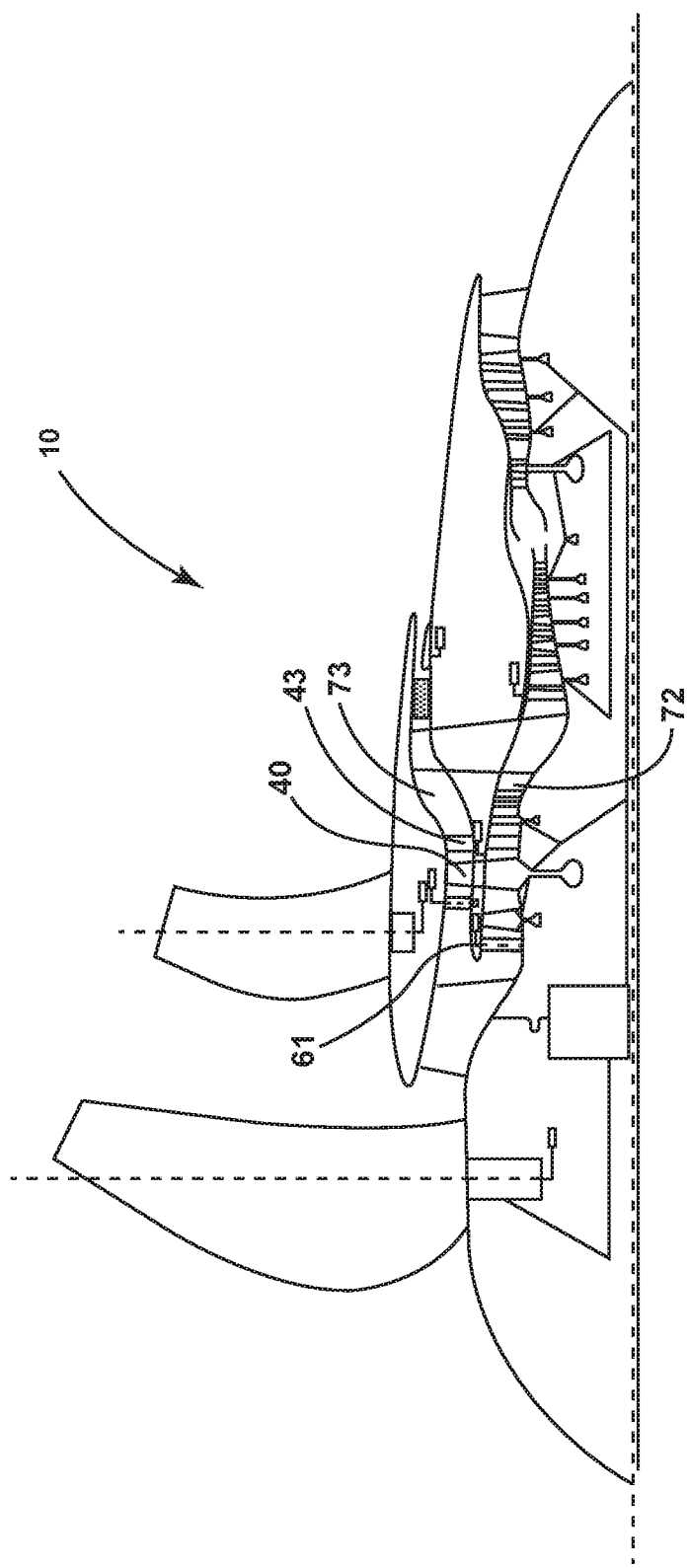
FIG. 7 is a cross-sectional schematic illustration of an exemplary embodiment of an open rotor propulsion system.

In a variation of the configuration depicted in FIG. 5, the splitter 61 may carry forward to the aft edge of the rotating ducted fan blades 40 and the fan blades 40 themselves may include an integral splitter which effectively divides the air stream into radially inner and radially outer streams in proximity to the fan itself. This may be termed a blade-on-blade configuration where radially inner and radially outer blades are effectively superimposed upon one another and may be unitarily formed or otherwise fabricated to achieve the split between streams. FIGS. 6 and 7 illustrate embodiments with such a blade-on-blade configuration. Such configurations are described in greater detail in commonly-assigned, issued U.S. Pat. No. 4,043,121, which is incorporated herein by reference.

Figure 8:
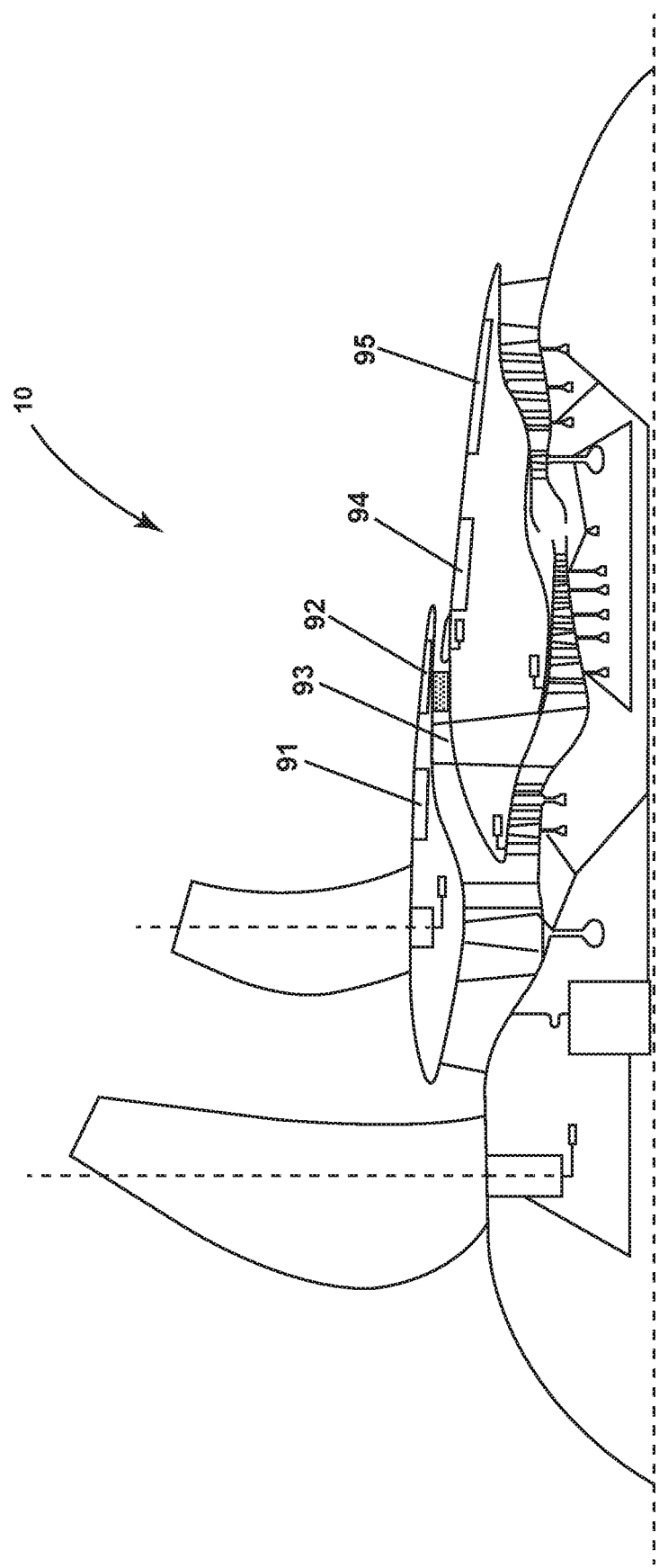
FIG. 8 is a cross-sectional schematic illustration of an exemplary embodiment of an open rotor propulsion system, depicting potential locations for acoustic treatment.

FIG. 8 is a cross-sectional schematic illustration of an exemplary embodiment of an open rotor propulsion system 10, depicting potential locations for noise suppression materials or structures in order to reduce noise emitted from the propulsion system. One potential location, 91, is on the outer surface of the fan cowl 77, aft of the vanes 31, while another potential location 93 is on the surface of the strut 42 within the fan duct 73. Location 92 is on the aft surface of the fan cowl 77, while location 94 is located on the core cowl 76 aft of the fan nozzle 78. Finally, location 95 is on the surface of the core cowl 76 downstream of the fan nozzle 78. Any suitable materials and designs may be utilized for noise suppression, including perforated panels, textured surfaces, and metallic and/or composite materials manufactured by any suitable techniques. Noise suppression materials or structures may be targeted toward noise from the core gas turbine engine, the ducted fan, or the unducted fan, or any combination thereof, and may be applied to propulsion system surfaces or may be a feature incorporated into the surfaces themselves.

Broadband acoustic treatment to suppress noise over a wide spectrum may utilize a composite shell with an internal chopped fiber system. High temperature areas with limited fluid interactions can use Ox-Ox Ceramic Matric Composite (CMC). Composite plies, or even the chopped fiber itself, can be selected in order to act as a firewall barrier in addition to an acoustics suppression device (e.g. Nextel 312 fiber). Lower temperature broadband acoustic treatment systems can use a more traditional fluid absorption tolerant composite material with chopped carbon fiber. BMI, MVK, or RM1100 are all viable composite material systems that have increasing levels of temperature capability, and can be selected depending on the thermal environment.

Tuned high temperature composite noise suppression systems compete directly with Titanium systems. Tuned honeycomb RM1100 panels offer a possible cost reduction compared to bonded/hot formed Titanium honeycomb panels. Ox-Ox tuned panels could provide temperature capability beyond that of Titanium material systems.

Additional noise suppression features could include the integration of geometrical shapes such as Chevrons into the trailing edge of the fan nozzle 78 and/or the trailing edge of the core nozzle 79. Other locations for noise suppression features could include the ducted fan inlet (between locations D and F) and the fan duct downstream of the ducted fan 40.

OGV's for the ducted fan may be slatted, tandem, or single, and may be of metallic or composite construction and fabricated using any suitable manufacturing method. Blades 21 and vanes 31, as well as blades 40, may also be of metallic or composite construction and fabricated using any suitable manufacturing method.

Figure 9:
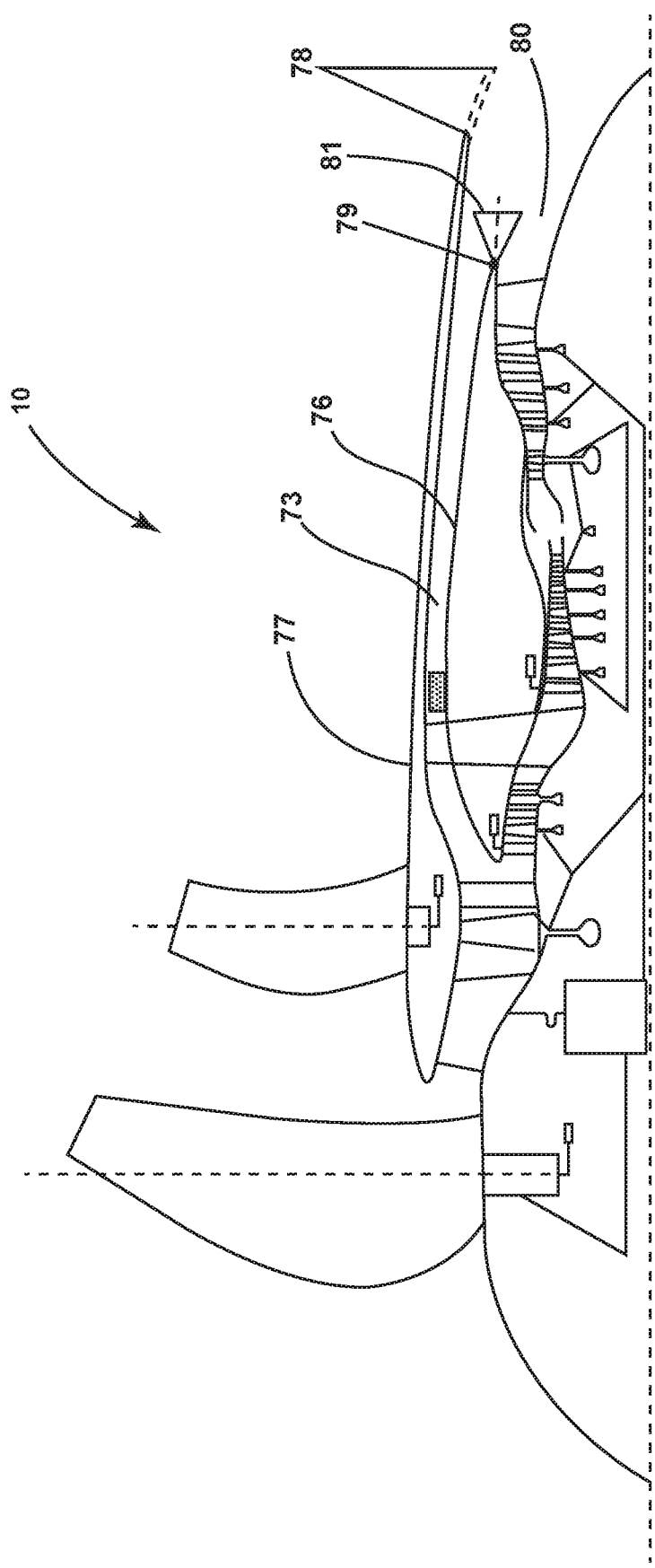
FIG. 9 is a cross-sectional schematic illustration of an exemplary embodiment of an open rotor propulsion system, having an elongated mixing duct.

FIG. 9 is a cross-sectional schematic illustration of an exemplary embodiment of an open rotor propulsion system 10, having an elongated mixing duct formed by an extended fan duct 73 extending between the fan cowl 77 and the core cowl 76 the full length of the core cowl 76 such that the fan nozzle 78 is downstream of the exhaust plane 80 of the core gas turbine engine and core nozzle 79. A mixing device 81 may be included in the region aft of the core nozzle 79 to aid in mixing the fan stream and core stream to improve acoustic performance by directing core stream outward and fan stream inward. Mixing is known to improve performance and noise emissions, particularly at a comparatively low bypass ratio (BPR) such as depicted in the Figures. Bypass ratios of 0.1 to 1 or 0.1 to 2 may be contemplated as exemplary ratios suitable for use with configurations described herein. It may be desirable that the nozzle 78 has a means to vary throat area. It may also be desirable that the mixer include variable geometry that allows for the optimization of the split between the hot side and cold side mixer areas to minimize losses as engine bypass ratio increases or decreases during normal operation.

As shown in FIG. 9, in one potential embodiment, which combines both variable mixing area and variable nozzle area, the core cowl 77 may include a translating mechanism to alter the position of the fan nozzle 78 (shown in 2 different positions with solid and dotted lines) in the axial direction, thereby providing another option for varying the nozzle exit area. Such variation may vary the hot-to-cold area ratio between the two streams, by translating the fan nozzle or otherwise. The shape of the centerbody 81 will determine if only the area ratio varies or both A8 and the area ratio.

Figure 10:
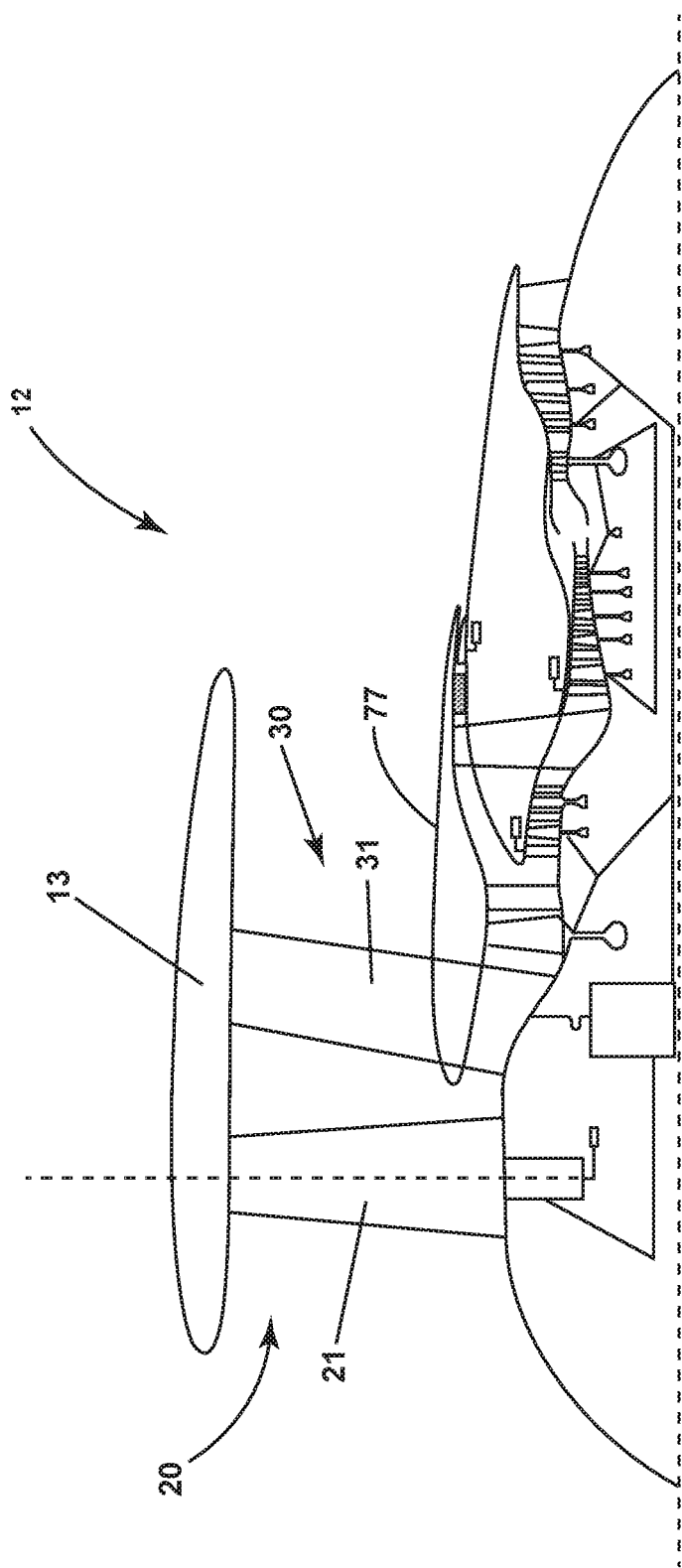
FIG. 10 is a cross-sectional schematic illustration of an exemplary embodiment of ducted propulsion system.

FIG. 10 is a cross-sectional schematic illustration of an exemplary embodiment of a ducted fan propulsion system 12. As many common elements are illustrated in FIG. 10 as in FIG. 1, like numerals are used to reference like elements. However, unlike the open rotor configuration of FIG. 1, the rotating element 20 and its airfoil blades 21 are contained within an annular fan case 13 and the stationary element 30 and the vanes 31 extend radially between the fan cowl 77 and the inner surface of the fan case 13. In this configuration, reverse thrust capability upon aircraft landing may be accomplished through a nacelle/thrust reverser system (not shown) or, advantageously, may be provided by the blades 21 in a reverse pitch configuration. As discussed above with respect to FIG. 1, the blades 21 of FIG. 10 may have a fixed pitch or blade angle, or may instead have a variable pitch or blade angle to vary thrust and blade loading during operation and, in some configurations, to provide a reverse thrust configuration for aircraft deceleration upon landing.

With regard to the exemplary embodiments depicted herein, either single or multiple gearboxes may be employed. A gearbox between the unducted fan and the ducted fan may have a ratio of between about 2:1 and 12:1, and a second gearbox between the booster and the ducted fan with a traditional HP turbine. Another configuration may utilize two counter-rotating turbines with two LP shafts coming forward, or counter-rotating turbines may drive a common LP shaft coming forward. In each case, an aft gearbox may have a ratio between about 2:1 and 5:1.

The dimensions between points identified with paired letters A-B, C-D, E-F, and G-H shown in the Drawing Figures are variables which may be tailored to provide the desired engine operating characteristics at desired flight and operating conditions.

Potential benefits achievable using the embodiments described herein include: reduced gearbox size and ratio; reduced fan and core speed variation over a wide operating range (improving performance of electrical power generation systems); improved core gas turbine operability during reverse thrust; expanded trade space between prop diameter (installation weight), gear ratio, booster stage count, and LPT loading; and reduced low pressure spool and high pressure spool speed migration.

The total desired thrust produced by the gas turbine engine may be varied as needed to suit the operational conditions and flight envelope for the associated aircraft. The maximum design work split between the unducted fan and the ducted fan may also be varied as needed, such as, for example, in certain embodiments up to approximately 60% of the total thrust may be produced by the ducted fan to minimize the engine diameter or noise, while in another embodiment only a few percent of the total thrust if the primary function of the ducted fan stream is as a thermal sink. Pressure ratios for the aft ducted fan may be less than about 2.5.

Gear box ranges may be tailored as well to suit the operating conditions and flight envelop for the gas turbine engine and associated aircraft, and gear box ratios may be split between multiple individual gearboxes. Other gearbox arrangements may be considered, such as adding counter-rotating stages, power-sharing, etc.

Figure 11:
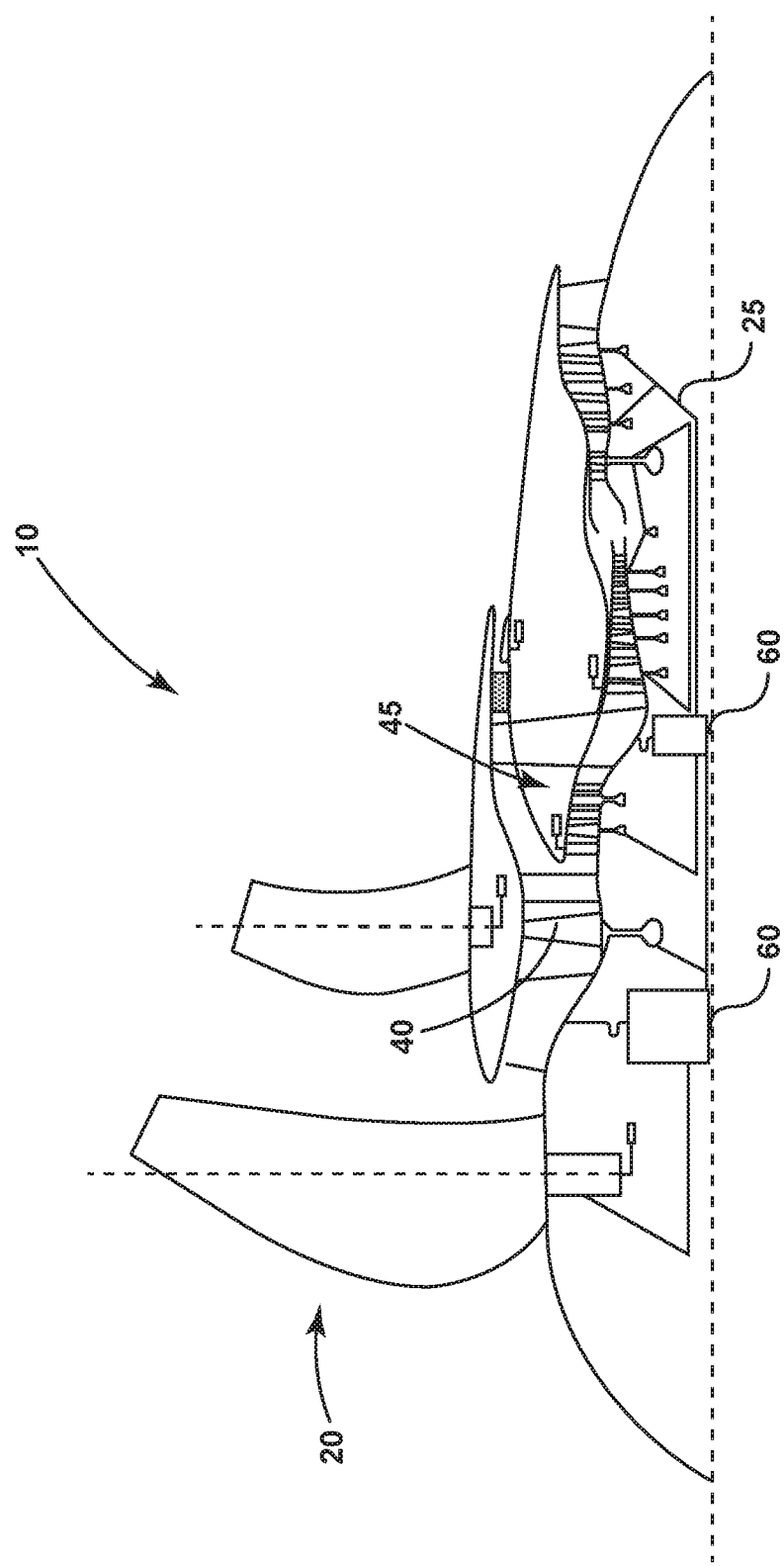
FIGS. 11-15 are cross-sectional schematic illustrations of exemplary embodiments of open rotor propulsion systems with varied gearbox installations.
Figure 12:
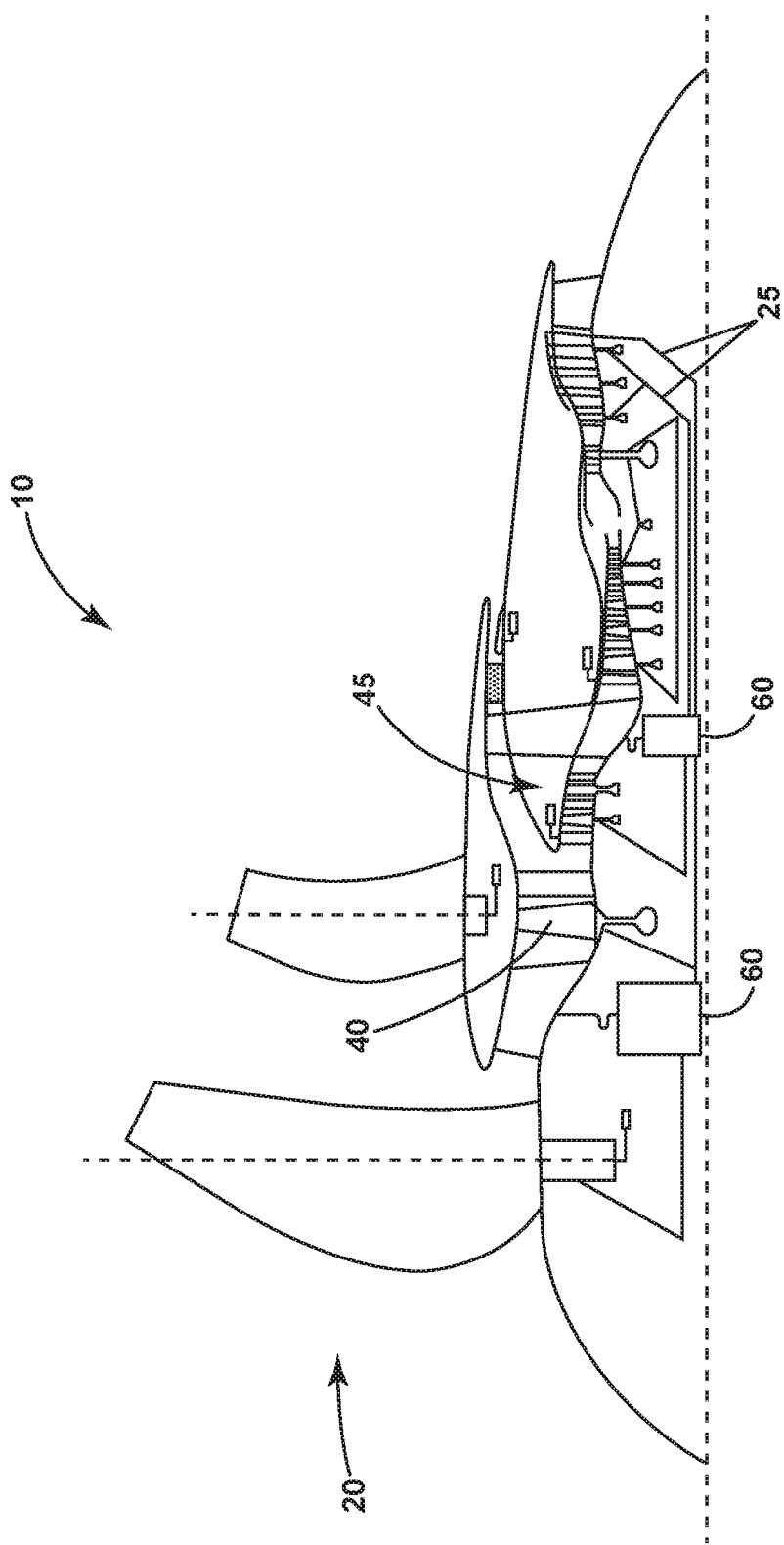
Figure 13:
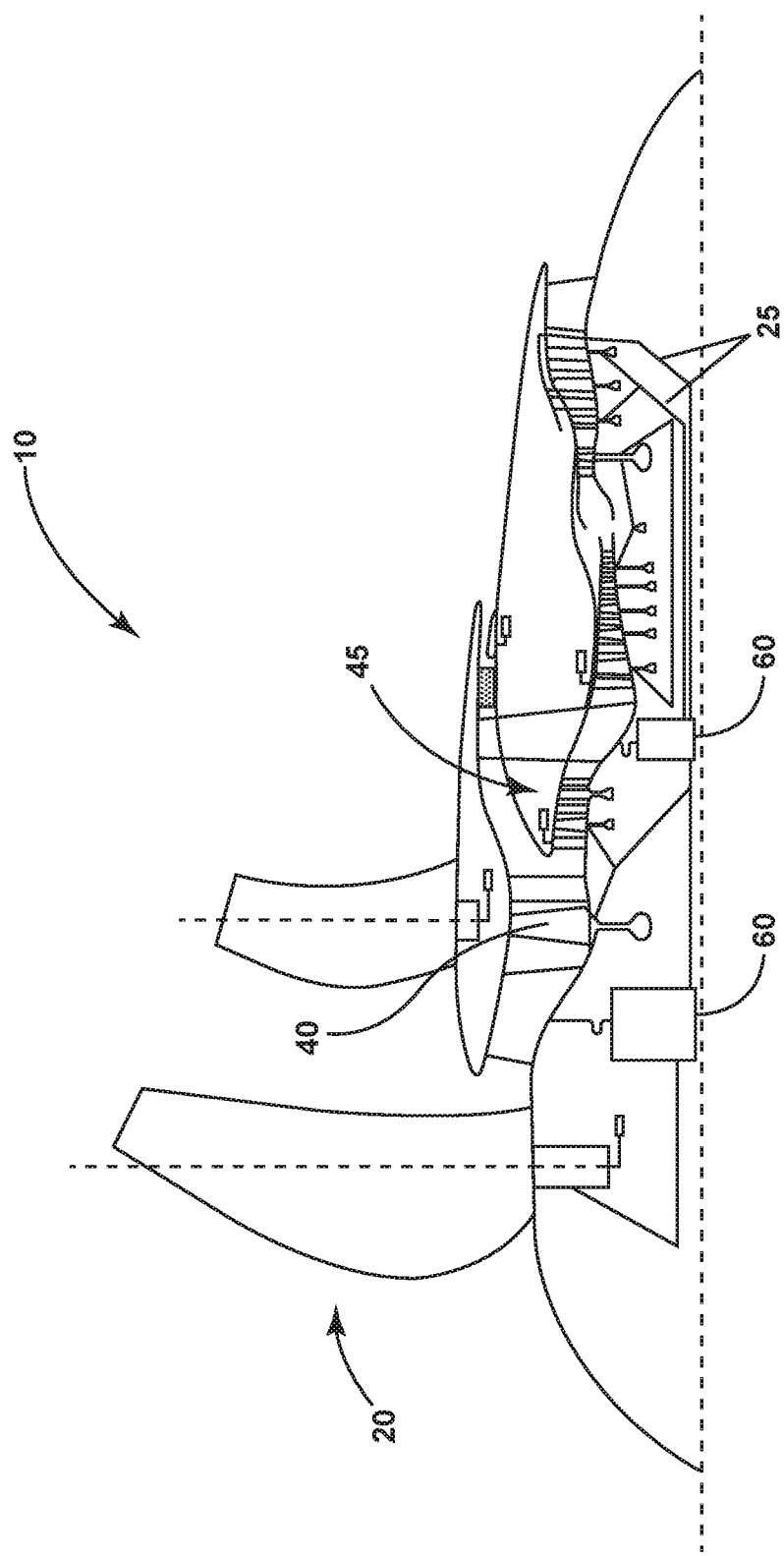
Figure 14:
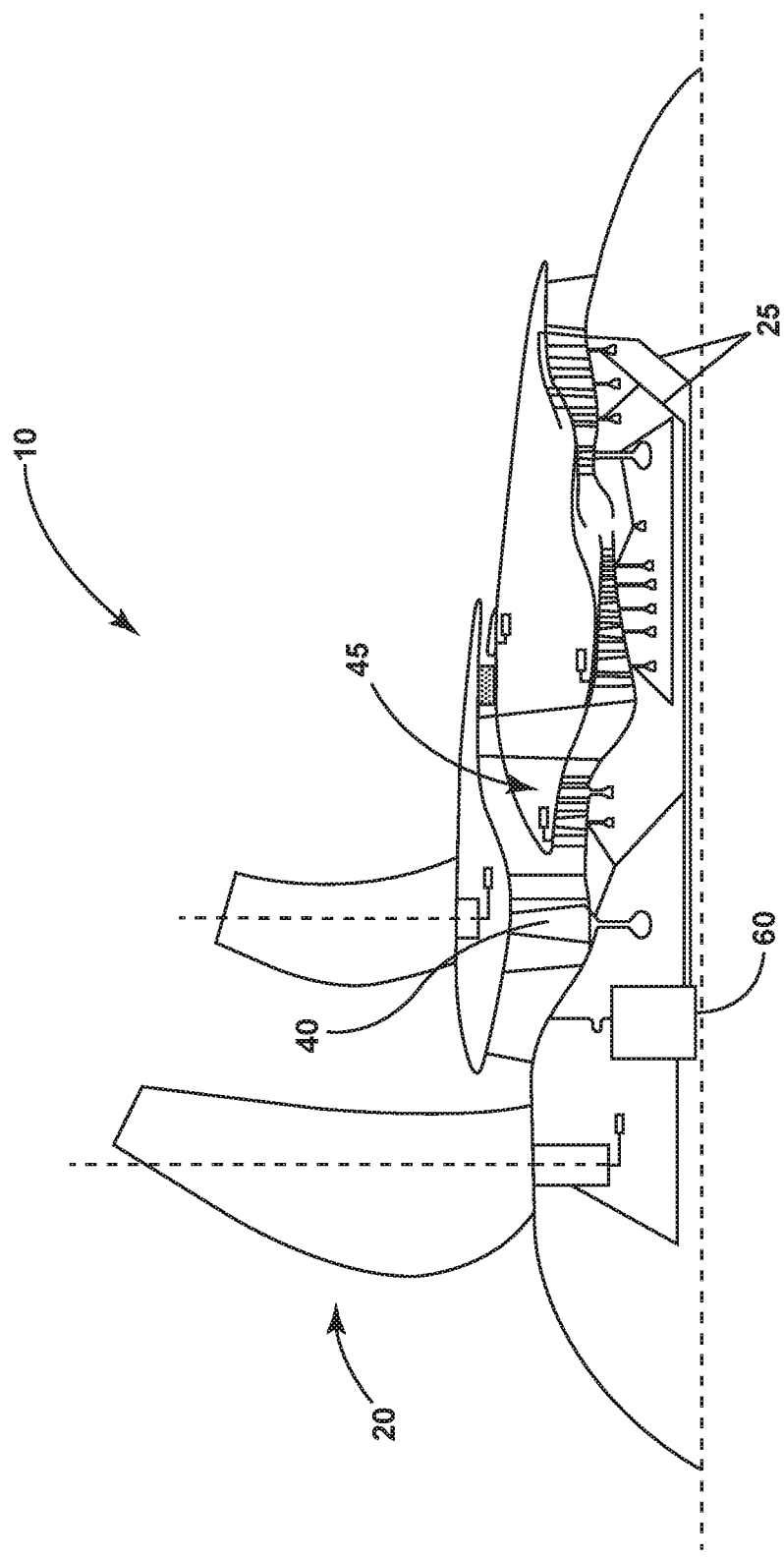
Figure 15:
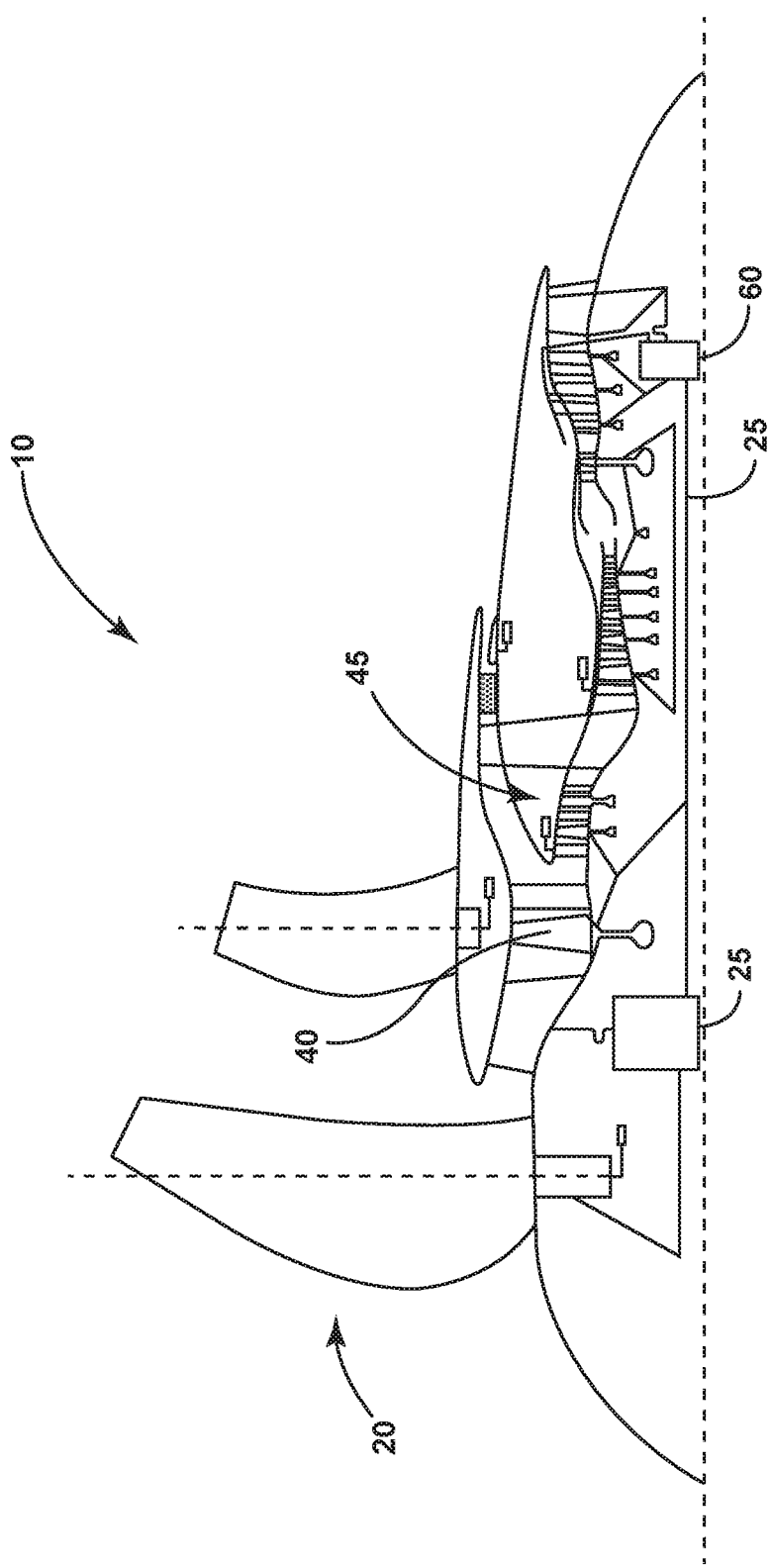

FIGS. 11-15 are cross-sectional schematic illustrations of exemplary embodiments of open rotor propulsion systems with varied gearbox installations. Like elements from prior Figures are referenced in FIGS. 11-15 by like numerals. FIG. 11 illustrates 2 gear boxes 60 for reducing rotational speed on the LP shaft 25 with the booster driven by the high speed side of the aft gear box 60 and the ducted fan driven by the low speed side of the aft most gear box 60. FIG. 12 illustrates 2 gear boxes 60 for reducing rotational speed on the LP shaft 25 driven by an interdigitated vaneless counter-rotating LP turbine, which has 2 sets of counter-rotating turbines blades with alternate rows on either a radially-inward rotating disk or a radially-outward rotating drum. FIG. 13 illustrates 2 gear boxes 60 with the booster and ducted fan driven at the same rotational speed from an interdigitated vaneless counter-rotating LP turbine. FIG. 14 illustrates a single gearbox 60 with the booster and ducted fan driven at the same rotational speed by an interdigitated vaneless counter-rotating LP turbine. Finally, FIG. 15 illustrates 2 gear boxes 60, one forward and one aft, with the booster and ducted fan driven at the same rotational speed from an interdigitated vaneless counter-rotating LP turbine.

Heat exchangers can be used to cool fluids and/or gases, depending upon the architecture of the engine. For example, the heat exchanger could cool oil, or it could be used to reject heat from air that is bled from the compressor. Heat exchangers can be of the surface cooler type, or a more traditional brick type cooler. Heat exchangers can be on the surface, fully immersed in the flowpath, or part of a structural strut that supports the inner portion of the frame.

In various embodiments, the source of power to drive the rotating element 20 may be a gas turbine engine fuelled by jet fuel or liquid natural gas, an electric motor, an internal combustion engine, or any other suitable source of torque and power and may be located in proximity to the rotating element 20 or may be remotely located with a suitably configured transmission such as a distributed power module system.

In addition to configurations suited for use with a conventional aircraft platform intended for horizontal flight, the technology described herein could also be employed for helicopter and tilt rotor applications and other lifting devices, as well as hovering devices.

Various characteristics, aspects, and advantages of the present disclosure may also be embodied in any permutation of aspects of the disclosure, including but not limited to the following technical solutions as defined in the enumerated aspects:

1. A propulsion system, the propulsion system comprising a rotating element, a stationary element, and an inlet between the rotating element and the stationary element, wherein the inlet passes radially inward of the stationary element; wherein the inlet passes radially inward of the stationary element; wherein the inlet leads to an inlet duct containing a ducted fan having an axis of rotation and a plurality of blades; and wherein the inlet duct divides into a first duct and a second duct, separate from the first duct.

2. The propulsion system of Aspect 1, wherein the rotating element is a ducted rotating element or an unducted rotating element.

3. The propulsion system of Aspects 1 or 2, wherein the first duct is a radially inward core duct downstream of the ducted fan and the second duct is a radially outward fan duct downstream of the ducted fan.

4. The propulsion system of any preceding Aspect, wherein the rotating element has an axis of rotation and a plurality of blades and the stationary element has a plurality of vanes configured to impart a change in tangential velocity of the air opposite to that imparted by the rotating element; and wherein the inlet leads to an inlet duct containing a ducted fan having an axis of rotation and a plurality of blades, the ducted fan being disposed at about the same axial location as the stationary element, aft of the stationary element, or forward of the stationary element, and radially inward of the stationary element.

5. The propulsion system of any preceding Aspect, wherein the rotating element is driven via a torque producing device selected from the group consisting of electric motors, gas turbines, gear drive systems, hydraulic motors, and combinations thereof.

6. The propulsion system of any preceding Aspect, wherein a noise reduction treatment comprises surfaces downstream of the stationary element, and wherein a sound absorbing material is applied to at least one of the surfaces or at least one of the surfaces comprises a sound absorbing material.

7. The propulsion system of any preceding Aspect, wherein the second duct includes an axially translatable variable area fan nozzle.

8. The propulsion system of any preceding Aspect, wherein the first duct fluidly communicates with a core gas turbine engine.

9. The propulsion system of Aspect 8, wherein the core gas turbine engine has an exit plane and a core nozzle at the exit plane.

10. The propulsion system of Aspects 8 or 9, wherein the fan duct extends aft to a fan nozzle which is aft of the core nozzle.

11. The propulsion system of Aspect 8, wherein the core gas turbine engine includes a booster, and the booster and ducted fan are driven at the same speed.

12. The propulsion system of any preceding Aspect, wherein the ducted fan is located radially inwardly of the stationary element.

13. The propulsion system of any preceding Aspect, wherein at least one heat exchanger is applied to a surface or duct downstream of the stationary element.

14. The propulsion system of any preceding Aspect, wherein the second duct includes a mixer and a nozzle configured to vary the mixer hot to cold area ratio.

15. The propulsion system of any preceding Aspect, wherein at least one of the rotating element and the ducted fan are operated through a gear box 16. A method of operating a propulsion system, comprising the steps of: operating a first rotating fan assembly to produce a first stream of air; directing a portion of the first stream of air into a second ducted rotating fan assembly; operating the second ducted rotating fan assembly to produce a second stream of air; dividing the second stream of air into a core stream and a fan stream; and directing the core stream into a gas turbine engine core.

17. The method of Aspect 16, wherein the first rotating fan assembly is an open rotor or a ducted fan.
18. The method of Aspects 16 or 17, wherein the core stream, the fan stream, and the first stream are arranged concentrically radially outwardly.
19. The method of Aspects 16-18, further comprising the step of passing the fan stream through a heat exchanger.
20. The method of Aspects 16-19, wherein at least one of the first rotating fan assembly and the second ducted rotating fan assembly are operated through a gear box.
21. The propulsion system of Aspects 1-15, wherein the stationary element has at least one vane including a shroud distally from the axis.
22. The propulsion system of Aspects 1-15 and 21, wherein the stationary element has at least one vane attached to an aircraft structure.
23. The propulsion system of Aspects 1-15 and 21-22, wherein the stationary element includes more than two vanes.
24. The propulsion system of Aspects 1-15 and 21-23, wherein the open rotor propulsion system is a tilt rotor system or a helicopter lift system.
25. The propulsion system of Aspects 1-15 and 21-24, wherein the second duct includes a variable area fan nozzle, and the variable area fan nozzle is a translatable plug nozzle.
26. The propulsion system of Aspects 1-15 and 21-25, wherein the ducted fan further includes an outlet guide vane downstream of the ducted fan.
27. The propulsion system of Aspects 1-15 and 21-26, wherein the outlet guide vane has a variable pitch.
28. The propulsion system of Aspects 1-15 and 21-27, wherein the variable area fan nozzle is replaced by a device or incorporates a functionality to reverse the thrust of the ducted stream.
29. The propulsion system of Aspects 1-15 and 21-28, wherein the ducted fan includes an integral splitter.
30. The propulsion system of Aspects 1-15 and 21-29, wherein the ducted fan includes variable inlet guide vanes.
31. The propulsion system of Aspects 1-15 and 21-30, wherein the inlet guide vanes of the bypass and core streams may be concentrically actuated or axially split and independently actuated or mechanically linked.
32. The propulsion system of Aspects 1-15 and 21-31, wherein at least one of the first duct and the second duct includes a plurality of chevrons.
33. The method of Aspects 16-20, further comprising the step of mixing the fan stream and the core stream with a mixing device.
34. The method of Aspects 16-20 and 33, wherein the gas turbine engine core operates the first rotating fan assembly and the second ducted rotating fan assembly.

While this disclosure has been described as having exemplary embodiments, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A propulsion system comprising:
a booster, a combustor, and a turbine arranged in a serial flow relationship;
a shaft that is coupled to the booster and the turbine;
a rotating element positioned upstream from the booster;
a stationary element positioned downstream from the rotating element, the stationary element including an array of vanes;
an inlet positioned axially between the rotating element and the stationary element, the inlet being positioned radially inward of the stationary element;
an inlet duct in fluid communication with the inlet;
a ducted fan positioned within the inlet duct and coupled to the shaft, the ducted fan comprising a plurality of airfoils;
a first duct downstream from and in fluid communication with the inlet duct; and
a second duct downstream from and in fluid communication with the inlet duct, wherein the second duct is separate from the first duct, wherein the inlet duct divides into the first duct and the second duct,
wherein the booster comprises a plurality of booster stages coupled to the shaft, each of the plurality of booster stages comprising booster airfoils, wherein the ducted fan is a booster stage of the plurality of booster stages and all airfoils coupled to the shaft and positioned downstream from the rotating element and positioned upstream from the combustor are booster airfoils, and wherein the inlet duct divides into the first duct and the second duct at a location downstream of the ducted fan and upstream of the rest of the plurality of booster stages,
wherein the propulsion system defines a bypass airflow stream radially outward of the inlet, and wherein the second duct is in airflow communication with the bypass airflow stream;
a first gearbox, wherein the rotating element is operated through the first gearbox; and
a second gearbox, wherein the ducted fan is operated through the second gearbox.

2. The propulsion system of claim 1, wherein the rotating element is an unducted rotating element.

3. The propulsion system of claim 1, wherein the first duct is a radially inward core duct downstream of the ducted fan and the second duct is a radially outward fan duct downstream of the ducted fan.

4. The propulsion system of claim 1, wherein the rotating element has an axis of rotation and a plurality of blades and the stationary element has the array of vanes configured to impart a change in tangential velocity of the air opposite to that imparted by the rotating element; and
wherein the ducted fan is disposed at the same axial location as the stationary element, aft of the stationary element, or forward of the stationary element, and radially inward of the stationary element.

5. The propulsion system of claim 1, wherein the rotating element is driven via a torque producing device selected from the group consisting of electric motors, gas turbines, gear drive systems, hydraulic motors, and combinations thereof.

6. The propulsion system of claim 1, wherein a noise reduction treatment comprises surfaces downstream of the stationary element, and wherein a sound absorbing material is applied to at least one of the surfaces or at least one of the surfaces comprises a sound absorbing material.

7. The propulsion system of claim 1, wherein the second duct includes an axially translatable variable area fan nozzle.

8. The propulsion system of claim 1, wherein the first duct fluidly communicates with a core gas turbine engine.

9. The propulsion system of claim 1, wherein the booster and the ducted fan are driven at the same speed.

10. The propulsion system of claim 1, wherein the ducted fan is positioned radially inward of the stationary element.

11. The propulsion system of claim 1, wherein at least one heat exchanger is applied to a surface of the first duct, wherein the at least one heat exchanger is positioned aft of the stationary element.

12. The propulsion system of claim 1, further comprising a core nozzle in fluid communication with the first duct, and wherein the second duct is in airflow communication with the bypass airflow stream at a location forward of the core nozzle.

13. The propulsion system of claim 1, wherein the array of vanes is positioned within the bypass airflow stream.

14. A method of operating a propulsion system, comprising the steps of:
- operating a first rotating fan assembly to produce a first stream of air;
- directing a portion of the first stream of air into a second ducted rotating fan assembly through an inlet positioned axially between the first rotating fan assembly and a stationary element, the stationary element including an array of vanes;
- operating the second ducted rotating fan assembly to produce a second stream of air;
- dividing the second stream of air into a core stream and a fan stream, the fan stream defined at least in part by a second duct;
- directing the core stream into the gas turbine engine core, wherein the gas turbine engine core comprises the booster, a combustor, and a turbine arranged in a serial flow relationship, and wherein the gas turbine engine core comprises a shaft that is coupled to the booster and the turbine;
- operating the booster, wherein the booster comprises a plurality of booster stages coupled to the shaft, each of the plurality of booster stages comprising booster airfoils, wherein the second ducted rotating fan assembly is a booster stage of the plurality of booster stages and all airfoils coupled to the shaft and positioned downstream from the first rotating fan assembly and positioned upstream from the combustor are booster airfoils, wherein dividing the second stream of air into a core stream and a fan stream comprises dividing the second stream of air into a core stream and a fan stream at a location downstream of the ducted rotating fan and upstream of the rest of the plurality of booster stages, wherein the propulsion system defines a bypass airflow stream radially outward of the inlet, and wherein the second duct is in airflow communication with the bypass airflow stream;
- operating the first rotating fan assembly through a first gearbox; and
- operating the second ducted rotating fan assembly through a second gearbox.

15. The method of claim 14, wherein the first rotating fan assembly is an open rotor.

16. The method of claim 14, wherein the core stream, the fan stream, and the first stream of air are arranged concentrically along a portion of the propulsion system.

17. The method of claim 14, wherein the propulsion system further comprises a core nozzle in fluid communication with the first duct, and wherein the second duct is in airflow communication with the bypass airflow stream at a location forward of the core nozzle.

* * * * *